P. Antonidus.
Potato-Digger.
N° 72773. Patented Dec. 31, 1867.
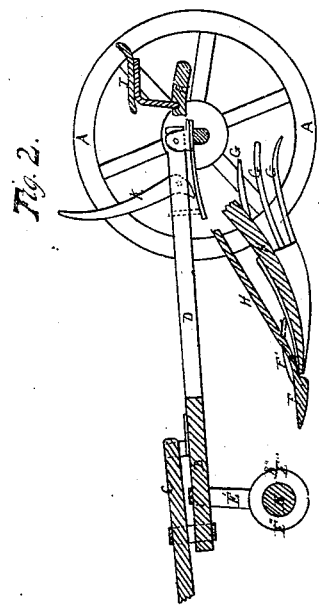
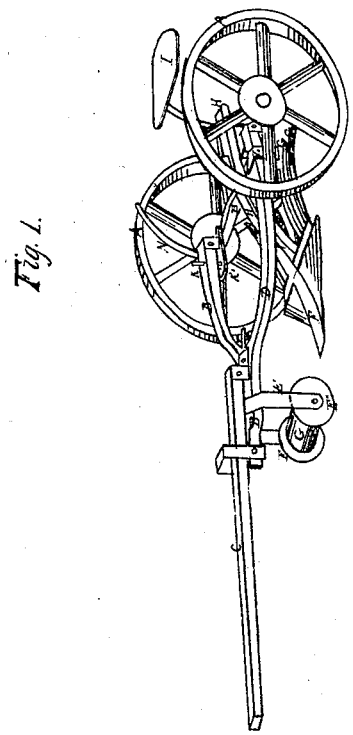
Witnesses:
L. Murphy
Chas. F. Clausen
Inventor:
Peter Antonides
by D. P. Holloway & Co
his Attys

United States Patent Office.

PETER ANTONIDUS, OF FREEHOLD, NEW JERSEY.

Letters Patent No. 72,773, dated December 31, 1867.

IMPROVEMENT IN POTATO-DIGGERS.

*The Schedule referred to in these Letters Patent and making part of the same.*

TO ALL WHOM IT MAY CONCERN:

Be it known that I, PETER ANTONIDUS, of Freehold, in the county of Monmouth, and State of New Jersey, have invented a new and useful Improvement in Potato-Diggers; and I do hereby declare that the following is a full, clear, and exact description of the same, reference being had to the annexed drawings, making part of this specification, in which—

Figure 1 is a perspective view, and

Figure 2 is a vertical longitudinal section.

The same letters in both figures indicate the same parts.

My invention consists in a device for attaching the plough and driver's seat to the axle, in such manner that the weight of the driver may be used to regulate the set of the plough, and in the arrangement of mechanism for regulating the depth of the cut.

The following description will enable persons skilled in the art to construct and apply to use my improved potato-digger.

A A are the wheels, connected by the axle B. C is the tongue, attached to the front of the hounds D, which are attached to the axle by a hinge-joint, allowing the axle to be turned, and raise or lower the digger, without affecting the horizontal position of the hounds. A roller, E, is attached to the front of the hounds by stirrups E'. This roller has upon its ends sharp flanges, E'', which being pressed into the earth on each side of the hills, will cut the vines. F is a shovel-plough, intended to run under the hill and throw the potatoes to the surface. Branched rods, F', are attached to the top of the plough, and are designed to throw the tops to the sides. A series of curved rods, G, is attached to the back end of the plough, to separate the potatoes, riding over the plough from the earth, which fall through the spaces between the rods G. The plough is attached to the axle by a bar, H, fastened rigidly to the plough and to the top of the axle. It passes behind the axle and supports the driver's seat I. The weight of the driver is intended to counterbalance that of the plough, and, by shifting his position on the seat, nearer to or further from the axle, the plough may be raised more or less, turning on the journals of the axle in the wheel. A lever, K, is pivoted to the hounds. The foot of this lever is shaped as a cam, which, bearing against the plate K', extending forward from the axle under the hounds, may, by turning down the end of the lever, hold the plough steady in passing through the ground. A set-screw, L, passes through a yoke attached to the plate, which extends in like manner from the axle under the hounds, as does the plate K'. By raising or lowering this set-screw, the depth of the cut may be regulated.

What I claim as my invention, and desire to secure by Letters Patent, is—

1. The combination of the plough F, axle B, and hounds D, when the latter are so connected with the axle by hinged joints, that the depth of the cut may be regulated without interfering with the horizontal position of the hounds, substantially as set forth.

2. The combination of the plough F, bar H, axle B, hounds D, plate K', and lever K, constructed and arranged substantially as set forth.

3. The combination of the plough F, bar H, axle B, hounds D, and set-screw L, constructed and arranged substantially as and for the purpose set forth.

In testimony whereof, I have signed my name to this specification in the presence of two subscribing witnesses.

PETER ANTONIDUS.

Witnesses:
WM. B. SUTTHEN,
R. B. HENDRICKSON.